US012597222B2

(12) United States Patent
Marano et al.

(10) Patent No.: US 12,597,222 B2
(45) Date of Patent: Apr. 7, 2026

(54) METHOD AND SYSTEM FOR DETERMINING A REGION OF WATER CLEARANCE OF A WATER SURFACE

(71) Applicant: ABB Schweiz AG, Baden (CH)

(72) Inventors: Stefano Marano, Zürich (CH); Bruno Arsenali, Brugg (CH); Deran Maas, Zürich (CH); Kalevi Tervo, Espoo (FI); Jukka Peltola, Espoo (CH)

(73) Assignee: ABB Schweiz AG, Baden (CH)

( * ) Notice: Subject to any disclaimer, the term of this patent is extended or adjusted under 35 U.S.C. 154(b) by 236 days.

(21) Appl. No.: 18/534,120

(22) Filed: Dec. 8, 2023

(65) Prior Publication Data

US 2024/0193904 A1 Jun. 13, 2024

(30) Foreign Application Priority Data

Dec. 9, 2022 (EP) ..................................... 22212496

(51) Int. Cl.
*G06V 10/26* (2022.01)
*G06T 7/11* (2017.01)
(Continued)

(52) U.S. Cl.
CPC ................ *G06V 10/26* (2022.01); *G06T 7/11* (2017.01); *G06T 7/70* (2017.01); *G08G 3/02* (2013.01)

(58) Field of Classification Search
CPC ........ G06V 10/26; G06V 10/82; G06V 20/52; G06V 20/56; G06T 7/11; G06T 7/70; G06T 2207/30252; G08G 3/02; B63B 43/18
See application file for complete search history.

(56) References Cited

U.S. PATENT DOCUMENTS 7,047,114 B1 * 5/2006 Rogers ..................... G08G 3/02
701/21
9,569,671 B1 * 2/2017 Maali ..................... H04N 7/181
(Continued)

FOREIGN PATENT DOCUMENTS

CN 109919026 A 6/2019
CN 110287837 A 9/2019

OTHER PUBLICATIONS

European Extended Search Report, Application No. 22212496.8, dated Jun. 2, 2023, 13 pps.
(Continued)

*Primary Examiner* — Wesley J Tucker

(74) *Attorney, Agent, or Firm* — McCarter & English, LLP

(57) ABSTRACT

A method and a system for determining a region of water clearance of a water surface are disclosed. The method includes receiving image data of an image captured by a camera, determining water surface pixels of the image from the image data, determining image coordinates of at least a first group of the determined water surface pixels in an image coordinate system, determining a position and an orientation of the camera at the time the image has been captured, determining real-world coordinates of the corresponding water surface in the real world by transferring at least the image coordinates of the first group to a real-world coordinate system under consideration of the determined position and orientation of the camera, and determining a region of the water surface, which is defined by the determined real-world coordinates of the first group, as the region of water clearance.

12 Claims, 3 Drawing Sheets

(51) Int. Cl.
 G06T 7/70 (2017.01)
 G08G 3/02 (2006.01)

(56) References Cited

U.S. PATENT DOCUMENTS

| | | | | |
|---|---|---|---|---|
| 10,922,552 | B2 * | 2/2021 | Maali | G06T 7/292 |
| 12,466,522 | B1 * | 11/2025 | Yu | B63B 49/00 |
| 2009/0315756 | A1 * | 12/2009 | Imazu | B63B 49/00 |
| | | | | 342/41 |
| 2015/0330804 | A1 * | 11/2015 | Okuda | G09B 29/007 |
| | | | | 701/487 |
| 2017/0154223 | A1 * | 6/2017 | Maali | H04N 23/23 |
| 2020/0208979 | A1 * | 7/2020 | Pandey | G01C 21/005 |
| 2021/0019521 | A1 * | 1/2021 | Park | G06N 3/092 |
| 2021/0114698 | A1 * | 4/2021 | Moon | G08G 3/02 |
| 2021/0357655 | A1 * | 11/2021 | Park | H04N 23/958 |
| 2021/0389765 | A1 * | 12/2021 | Behrendt | G06F 3/04815 |
| 2022/0024549 | A1 * | 1/2022 | Biancale | G01P 15/032 |
| 2023/0068036 | A1 * | 3/2023 | Park | G06F 18/21 |
| 2023/0195118 | A1 * | 6/2023 | Singh | B63B 79/15 |
| | | | | 701/21 |
| 2023/0331357 | A1 * | 10/2023 | Hara | B63B 79/10 |
| 2023/0351764 | A1 * | 11/2023 | Fujisawa | B63B 49/00 |
| 2024/0119843 | A1 * | 4/2024 | Wang | G08G 3/02 |
| 2025/0111682 | A1 * | 4/2025 | Arsenali | G06V 20/58 |

OTHER PUBLICATIONS

L. Steccanella et al., "Waterline and obstacle detection in images from low-cost autonomous boats for environment monitoring", Robotics and Autonomous Systems, Elsevier B.V., vol. 124, Nov. 5, 2019, pp. 1-11.

* cited by examiner

METHOD AND SYSTEM FOR DETERMINING A REGION OF WATER CLEARANCE OF A WATER SURFACE

CROSS REFERENCE TO RELATED APPLICATIONS

This patent application claims the benefit and priority of European Patent Application No. 22212496.8 filed on Dec. 9, 2022, the disclosure of which is incorporated by reference herein in its entirety as part of the present application.

BACKGROUND

The present disclosure relates to the field of water clearance determination for safe navigation. In particular, the present disclosure relates to a method and a system for determining a region of water clearance of a water surface.

A determination of a region of safe water around a vessel, i.e., water clearance determination, is important, e.g., when operating the vessel in confined waterbodies, for example during docking, navigation through narrow passages, and/or maneuvering within a harbor. The region of safe water, in other words the region of water clearance, corresponds to a portion of the waterbody that may be safely navigated by the corresponding vessel, at least with respect to a water surface free from any dangerous obstacles. When determining the region of water clearance, it is needed to account for the presence of solid objects within the corresponding water surface, such as land, a quay, poles, and/or a dock, but also any unexpected solid objects as another vessel, an animal swimming on the water surface, or floating debris, as e.g., a container.

A visual inspection of surroundings of the vessel, is the most common approach to determine the water clearance known in the art. For example, a crew of the vessel may monitor the surroundings of the ego vessel while it is maneuvering, and the crew may stay in contact with a captain of the vessel, e.g., by means of a telecommunication device (radio, walkie talkie, etc.). To gain a view on relevant areas around the vessel the crew may have to be positioned on different locations on the vessel such as at the bow, the stern, or one or both wings, in other words sides, of the vessel.

Another valuable input to the captain may be provided by technology already known in the art. For example, a visualization of a region of water clearance may be provided by technology in use which may rely on GPS and/or LIDAR. In particular, the water clearance with respect to the land or the dock may be extracted using GPS and one or more maps containing information about the corresponding coastline (e.g., provided by the dock and/or other parts of the land). A current position of the vessel may be obtained from the GPS data and one or more clearance distances from a hull of the vessel to the land and/or dock may be obtained with simple geometrical computations depending on the map(s) and the GPS data. However, this approach relies on information available in the corresponding map and on the GPS data only. It does not consider the presence of any unexpected solid object on the water surface, such as other vessels (without AIS) or any other floating solid objects. In particular, the other solid objects as, e.g., buoys, animals, containers, and/or poles, may not be available in the map and may not be considered with this known approach.

Another known approach for water clearance determination may rely on LIDAR sensors to estimate the water clearance. In particular, when approaching the dock, a LIDAR point cloud may be generated by the LIDAR sensors and may be analyzed. Then, a vertical wall corresponding to the dock may be found during the analysis. The water clearance may be computed from the hull of the vessel to such wall. However, a range of the LIDAR sensor may limit the applicability of this approach, and special long-range LIDAR sensors are particularly expensive. Further, this LIDAR approach may require harbor specific adaptations. For example, a dock structure presenting a ramp for vehicles may mislead the corresponding analyzing algorithm trying to find a vertical wall. In these cases, workarounds specific to the corresponding harbor may need to be introduced.

BRIEF DESCRIPTION

It is an aspect of the present disclosure to provide a method for determining a region of water clearance of a water surface, which may contribute to reducing a reliance on a crew of a vessel, which may enable to use one or more simple and/or cost-efficient sensors only, which may allow for a generalization to different vessels, harbors, and/or applications, and/or which may provide a valuable input for docking assistance and collision avoidance.

It is another aspect of the present disclosure to provide a system for determining the region of water clearance of the water surface, which may contribute to reducing the reliance on the crew of the vessel, which may enable to use one or more simple and/or cost-efficient sensors only, which may allow for the generalization to different vessels, harbors, and/or applications, and/or which may provide a valuable input for docking assistance and collision avoidance.

These aspects are achieved by the subject-matter of the independent claims. Further exemplary embodiments are evident from the dependent claims and the following description.

An aspect is achieved by a method for determining a region of water clearance of a water surface. The method includes receiving image data of an image captured by a camera, determining water surface pixels of the image from the image data, wherein the water surface pixels show an imaged water surface within the image, determining image coordinates of at least a first group of the determined water surface pixels in an image coordinate system, wherein the first group is representative for the imaged water surface, determining a position and an orientation of the camera at the time the image has been captured, determining real-world coordinates of the corresponding water surface in the real world by transferring at least the image coordinates of the first group to a real-world coordinate system under consideration of the determined position and orientation of the camera, and determining a region of the water surface, which is defined by the determined real-world coordinates of the first group, as the region of water clearance.

The proposed method relies on an automatic analysis of the image, and as such may allow to reduce the reliance on the crew and/or to use one or more simple and cost-efficient sensors, which replace more expensive sensors, e.g., such as LIDAR sensors. In particular, one or more digital cameras may be an inexpensive hardware that can be installed easily and cost-efficient compared to corresponding one or more LIDAR sensors. The method may also allow a very accurate generalization to different vessels, harbors, and/or applications. In addition, the region of safe water clearance, or "region of water clearance" only, may be a valuable input for the docking assistance and/or collision avoidance. The method may provide the region of water clearance up to the horizon.

The method presents a solution of one or more of the above aspects, the solution relying on one or more cameras, image segmentation, e.g., by machine learning techniques, and computer vision. The cameras may be installed at different locations where most suited to assist the vessel's operations, e.g., on an ego vessel or alternatively at land, e.g., at a dock and/or within a harbor. If a camera system is used, which does not provide any depth information of a scene captured by the camera with respect to the camera, reliable IMU readings may be required to determine a current pitch and roll of the ego vessel. If a camera system is used, which does provide depth information of the scene captured by the camera with respect to the camera, the method may be at least partly independent from any IMU data for determining the orientation of the ego vessel, e.g., for determining the pitch and the role of the ego vessel, as it is already known in the art. Changes of a draft of the ego vessel may also be considered, wherein, depending on the type of the ego vessel, the draft may not change significantly.

The image data may be generated by the camera and may be received by a processing unit carrying out the method. For example, the image data from the camera may be streamed to the corresponding processing unit. The processing unit may be a part of a general-purpose computer or of a system for determining the region of water clearance of the water surface, wherein the general-purpose computer may be arranged on the ego vessel or on land. The camera may be at least one of a group of cameras, the group including a single or monocular camera, a pair of cameras or a stereo camera, a Time-Of-Flight camera, a gated camera, and a structured light camera, wherein some of the cameras may be able to estimate a depth of the objects shown in the image relative to the camera. If the camera(s) provide the depth information of the scene captured by the corresponding camera(s) with respect to the camera(s), the image data may include a depth value for each of the pixels, wherein the depth value may provide information regarding a distance between the corresponding camera(s) and the object in the real world shown by the corresponding pixel. Alternatively or additionally, when using a Pan-Tilt-Zoom (PTZ) camera, it may be possible to scan the surroundings of the ego vessel and thus to increase an area in which the water clearance may be determined.

The imaged water surface may be an imaged representation of at least a part of the water surface for which the region of water clearance shall be determined. The image data may be processed by the processing unit to extract information about the presence of water for every pixel in the image, what may be referred to as water segmentation of the image. These water surface pixels may be determined by a first neural network which may have been trained on detecting water surfaces in images, in particular by a training data set including an amount of images showing water surfaces. The first neural network may be a Deep Neural Network (DNN), e.g., a neural network for semantic segmentation, e.g., a neural network for panoptic segmentation. The first neural network may also be configured for detecting other classes, e.g., other vessels, land, sky, and/or void, within the image, as explained below. The proposed approach may be generalized to different vessel types and/or applications. A requirement for this generalization is that sufficient and meaningful training data was used when training the DNN.

The output of the first neural network may be modified by determining the first group of the determined water surface pixels. The first group being representative for the imaged water surface may vary from image to image. The first group being representative for the imaged water surface may include a boundary of the imaged water surface. The boundary may include the outermost pixels of the imaged water surface and/or a polygon, which may be referred to as outer polygon, surrounding the imaged water surface such that the imaged water surface may be constructed from the first group of the determined water surface pixels. If the imaged water surface includes a hole, e.g., because of a solid object in the waterbody, e.g., an island, a buoy, or a container swimming on the water surface, the boundary alternatively or additionally may include the innermost pixels of the imaged water surface surrounding the corresponding hole in the imaged water surface, wherein these innermost pixels may also be represented by a corresponding polygon, which may be referred to as inner polygon. As an alternative to the first group including the pixels forming the inner and/or outer polygon only, the first group may include all water surface pixels. If the image shows two or more imaged water surfaces, correspondingly two or more outer polygons describing the two or more imaged water surfaces may be determined. Further, if the image shows two or more imaged holes in one or more of the imaged water surfaces, correspondingly two or more inner polygons describing the two or more imaged holes within the corresponding imaged water surface may be determined.

If the image does not show any imaged water surface, no water surface pixels and no corresponding image coordinates of the determined water surface pixels may be determined from the image data. In this case, the method may be terminated with the result that there is no region of water clearance. Alternatively, the method may be carried out further by analyzing one or more further images with respect to corresponding imaged water surfaces and corresponding water surface pixels.

The first group of pixels may be projected in the real world by determining the corresponding real-world coordinates. In this projection step, one or more camera calibration parameters and/or real-time information about ship motions (e.g., pitch and roll of the ego vessel) may be considered. In the result, a 2D map showing the region of water clearance within the field of view of the camera may be produced. In the following, such map may be further used to provide one or more water clearances, e.g., along one or more desired directions.

So, the present disclosure refers to a method for the determination of the region of water clearance in the surrounding of the vessel, e.g., the ego vessel. It is based on one or more images from one or more cameras, on machine learning, and computer vision techniques. Using such techniques, it is possible to obtain the 2D map of the region of water clearance around the ego vessel within the field of view of the corresponding camera(s).

According to an embodiment, the method includes determining solid object pixels of the image which show an imaged solid object touching the imaged water surface, determining image coordinates of at least a second group of the determined solid object pixels in the image coordinate system, wherein the second group is representative for the imaged solid object, determining real-world coordinates of the corresponding solid object in the real world by transferring at least the image coordinates of the second group to the real-world coordinate system under consideration of the position and orientation of the camera, and determining a region, which is defined by the determined real-world coordinates of the second group, as not being part of the region of water clearance.

The solid object may be an object swimming on the waterbody, e.g., another vessel, a container, an animal, e.g., a bird, or a buoy, or a solid object forming a boundary of the waterbody, e.g., land or a part of the land, e.g., a dock or a quay. The imaged solid object may be a representation of the solid object within the image. The solid object pixels may be determined by a neural network, which may have been trained on detecting corresponding solid objects in images, wherein the neural network may be the first neural network or a second neural network. In case of the first neural network determining the water surface pixels and the solid object pixels, the first neural network may be trained such that it is able to determine at least two classes, i.e., water surface and solid object, in particular by a training data set including an amount of images showing water surfaces and solid objects on the water surfaces. So, the step of determining the water surface pixels and the step of determining the solid object pixels may be carried out simultaneously by the same neural network.

The second group being representative for the imaged solid object may vary from image to image. The second group may include the outermost pixels of the imaged solid object. These outermost pixels may form a boundary of the imaged solid object and/or a polygon surrounding the imaged solid object, e.g., such that the imaged solid object may be constructed from the second group of the determined solid object pixels. Alternatively, the second group may include all solid object pixels.

According to an embodiment, the method includes determining whether the solid object, which is represented by the imaged solid object in the image, physically touches the water surface in the real world, and determining the real-world coordinates of the second group and the corresponding region only, if the solid object physically touches the water surface in the real world. A solid object not touching the water surface may be a structure within the field of view of the camera but not being related to the water surface, e.g., a bird flying through the field of view when the image was captured, or a structure fixedly coupled to the camera, e.g., a structure of the ego vessel or a structure on land on which the camera is arranged. The solid object not touching the water surface may be determined by a neural network, which may have been trained on detecting corresponding solid objects in images, wherein the neural network may be the first or the second neural network or a third neural network. In particular, the corresponding neural network(s) may be trained by a training data set including an amount of images showing imaged water surfaces and imaged solid objects touching the imaged water surfaces, wherein some of the corresponding solid objects touch the corresponding water surface in the real world and some do not. For example, in case of the first neural network determining whether the solid object, which is represented by the imaged solid object in the image, physically touches the water surface in the real world or not, the first neural network may be trained such that it is able to determine at least three classes, i.e., water surface, solid object touching the water surface, and solid object not touching the water surface.

Alternatively, e.g., in case of a bird flying through the field of view of the camera, the solid object not touching the water surface may be determined by comparing several images captured by the camera one after the other and checking whether the speed with which the solid object moves from one image to the other is sensible for a solid object swimming in the water or not. Alternatively, in case of the structure fixedly coupled to the camera, the solid object not touching the water surface may be determined by comparing several images captured by the camera one after the other and by checking whether a position of the structure within the image depends on a movement of the camera and in case the vessel on which the camera is arranged or not. In case the position of the structure does not change in relation to the movement of the camera, the solid object may be considered as being fixedly coupled to the camera and as not touching the water surface. These comparisons may be carried out and the corresponding results may be achieved by the second or third neural network or by simple image and/or video processing as it is known in the art.

In case of using one neural network only for determining the first group, the second group and/or the solid object not touching the water surface, e.g., the first neural network, the corresponding neural network may be trained to classify the image in several classes, wherein several class combinations corresponding to different levels may be possible. For example, a high-level class combination could be "water surface", "solid object", and "sky". At a lower level, the class "solid object" may be further divided into "animal", "land", "dock", "quay", and/or "other vessel". At an even lower level, the class "animal" may be further divided into "bird" and "wale". At an even lower level, the class "bird" may be further divided into "flying bird" and "swimming bird". Alternatively or additionally, the class "solid object" may be further divided into "big solid object" and "small solid object", and/or into "fast solid object" and "slow solid object", and/or "dangerous solid object" and "non-dangerous solid object".

Alternatively, in case of using one neural network only for determining the first group, the second group and/or the solid object not touching the water surface, e.g., the first neural network, the corresponding neural network may be trained to classify the image in accordance with one of the high level class combinations, e.g., "water", "solid object", and "sky", or "water", "animal", "land", "other vessel" and "sky", and the solid objects may be further differentiated by post processing, e.g., by checking the speed, as explained above, and/or the size of the corresponding solid objects.

In case of using two or more neural networks for determining the first group, the second group and/or the solid object not touching the water surface, e.g., the first, second, and/or third neural network, one of the neural networks may be trained to classify the image at a high level, e.g., as defined above, e.g., "water", "solid object" and "sky", and another one of the neural networks may differentiate the solid objects in accordance with the one of the lower level class combinations, e.g., as defined above. For example, the first neural network may determine the water surface pixels and the solid object pixels neighboring or touching the water surface pixels, and the second or third neural network may check whether the solid objects found in the image are dangerous for navigating the ego vessel or not.

According to an embodiment, the camera is arranged on the ego vessel, the position and orientation of the camera depends on a position and an orientation of the ego vessel, and the position and orientation of the camera is determined depending on the position and orientation of the ego vessel. The orientation of the ego vessel may include a pitch, a yaw, and/or a roll of the ego vessel. The position of the camera may be determined by the position of the ego vessel and by the position of the camera on the ego vessel, wherein the position of the ego vessel may be determined depending a geo-location and on a draft of the ego vessel. The geo-location of the ego vessel may be given by global coordinates, e.g., UTM-coordinates or GPS-Coordinates of the ego vessel. The position of the camera may include a height of the camera on the ego vessel. The position of the camera may also include a position of the camera on the ego vessel, in particular in relation to geo-location positioning system of the ego-vessel, e.g., a GPS receiver of the ego vessel. Alternatively, the position of the camera may include global coordinates of the camera itself, e.g., GPS-coordinates or UTM-coordinates of the camera. The orientation of the camera may include a pitch, a yaw, and/or a roll of the camera.

According to an embodiment, the determining of the region of water clearance includes generating 2D map data of a 2D map of the region of water clearance in the real-world coordinate system, and outputting the 2D map. The 2D map may be outputted by displaying the 2D map on a display. Alternatively or additionally, the 2D map may be outputted to an entity using the 2D map, e.g., to a navigation system of the ego vessel or of another vessel. The 2D map may be generated with respect to the ego vessel, e.g., based on a corresponding vessel coordinate system, or based on a Geographic Coordinate System, e.g., in terms of latitude and/or longitude.

According to an embodiment, the method includes determining a clearance distance over which the region of water clearance extends along a predetermined direction depending on the determined region of water clearance, and outputting the clearance distance. The clearance distance may be outputted by displaying the clearance distance in the predetermined direction on a display. Alternatively or additionally, the clearance distance may be outputted to an entity using the clearance distance, e.g., to the navigation system of the ego vessel or of another vessel. The predetermined direction may be any direction of interest. For example, if the camera is arranged on the ego vessel, the predetermined direction may correspond to a heading of the ego vessel, may be a direction of at least a segment of a route or of a swipe area of the ego vessel, or may be one of more directions which separate the field of view of the camera in several segments, e.g., in equal angular segments. The swipe area may be a predicted swipe area and may predict those parts of the water surface which are covered by the ego vessel in the near future, e.g., within the next seconds and/or minutes. If the camera is arranged on the ego vessel and if there are blind spots, which are not visible by the camera, next to or underneath a hull of the ego vessel, a size and/or extend of the blind spots may be determined in advance, may be stored on a memory of the entity carrying out the method, and may be considered when determining the clearance distance, such that the clearance distance may extend from the hull of the ego vessel to an end of the region of water clearance along the predetermined direction. The clearance distance may be outputted together with the predetermined direction.

According to an embodiment, the camera is arranged on the ego vessel, and the predetermined direction is a direction of at least a segment of the swipe area of the ego vessel. This may contribute to determine whether the current route and/or swipe area is safe. In particular, for safely navigating the vessel, it may be of interest, whether any solid object is within or even close to the swipe area of the vessel.

According to an embodiment, the method includes determining an object distance over which the region of water clearance extends to the closest solid object on the water surface depending on the determined region of water clearance, and outputting the object distance. The object distance may be outputted by displaying the object distance on a display. Alternatively or additionally, the object distance may be outputted to an entity using the object distance, e.g., to a navigation system of the ego vessel or of another vessel. If the camera is arranged on the ego vessel and if there are the blind spots next to or underneath the ego vessel, the size and/or extend of the blind spots may be determined in advance and may be considered when determining the object distance, e.g., as explained above in context with the clearance distance.

According to an embodiment, the camera is arranged on the ego vessel, and an angular margin to the solid object is determined depending on the determined region of water clearance. The angular margin may be determined with respect to the current route and/or the swipe area of the ego vessel.

According to an embodiment, the method includes determining whether the current route or the swipe area, both of which extend at least in part through the region of water clearance, of a vessel is safe. For example, it may be determined whether one or more solid objects are in the way along the route or, respectively swipe area, and if so, the route or, respectively swipe area, may be determined as not being safe. In this case, an alert may be generated. The vessel may be the ego vessel on which the camera is arranged, or another vessel, for example when the camera is arranged on land and is used for safely guiding the other vessel through the waterbody.

According to an embodiment, the method includes determining a safe route or a swipe area for a vessel depending on the region of water clearance. For example, the route may be determined such that the corresponding vessel may be safely navigated through the region of water clearance. The vessel may be the ego vessel on which the camera is arranged or another vessel, for example when the camera is arranged on land and is used for safely guiding the other vessel through the waterbody.

According to an embodiment, calibration values of the camera are determined, and the real-world coordinates of the water surface are determined depending on the calibration values. The calibration values may be stored in the memory of the system for determining the region of water clearance of the water surface and may be determined by receiving the calibration values from the memory. Alternatively, the calibration values may be determined by obtaining the calibration values from the camera. The calibration values may include intrinsic parameters, extrinsic parameters, and may be a lens distortion of the camera. The calibration values may also include the position of the camera on the ego vessel and/or the orientation of the camera with respect to the vessel coordinate system of the ego vessel. The camera position may correspond to a position of a center of the camera. The camera center may be given by a pinhole of the camera.

According to an embodiment, the method includes receiving image data of another image of at least a part of the water surface captured at the same time as the image, and determining the region of water clearance depending on the image data of the other image. The other image may be used to gain additional information regarding the water surface, in particular regarding the region of water clearance. The additional information may be derived as the information described above with respect to the image. The additional information may be combined with the information derived from the image. The additional information may be used to verify the determined region of water clearance, e.g., if the imaged parts of the water surface overlap each other, and/or to enhance the determined region of water clearance, e.g., if the imaged parts of the water surface do not or only in part overlap each other.

An aspect is achieved by the system for determining the region of water clearance of the water surface. The system includes the memory configured for storing the image data of the image captured by the camera, wherein the image shows the imaged water surface, and the processing unit which is configured for carrying out the above method. Further, the system may include the camera and may be one or more further cameras.

It has to be understood that features of the method for determining the region of water clearance of the water surface, as described in the above and in the following, may be features of the system for determining the region of water clearance of the water surface as described in the above and in the following.

These and other aspects of the disclosure will be apparent from and elucidated with reference to the embodiments described hereinafter.

BRIEF DESCRIPTION OF THE DRAWINGS

The subject matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

Figures 1, 2:
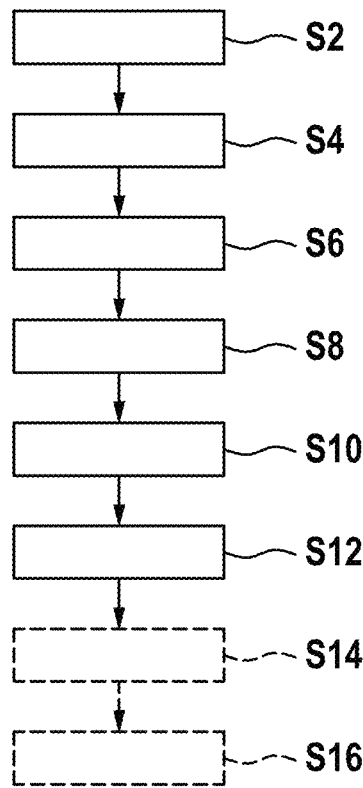
FIG. 1 shows a block diagram illustrating an exemplary embodiment of a system for determining a region of water clearance of a water surface.
FIG. 2 shows a flow-chart of an exemplary embodiment of a method for determining the region of water clearance of the water surface.
Figure 3:
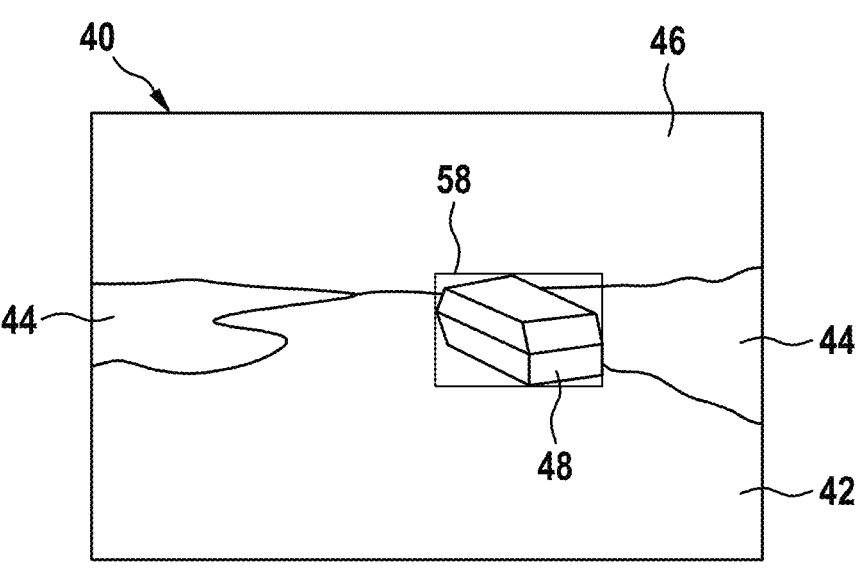
FIG. 3 shows an example of an image showing a vessel in a waterbody.
Figure 4:
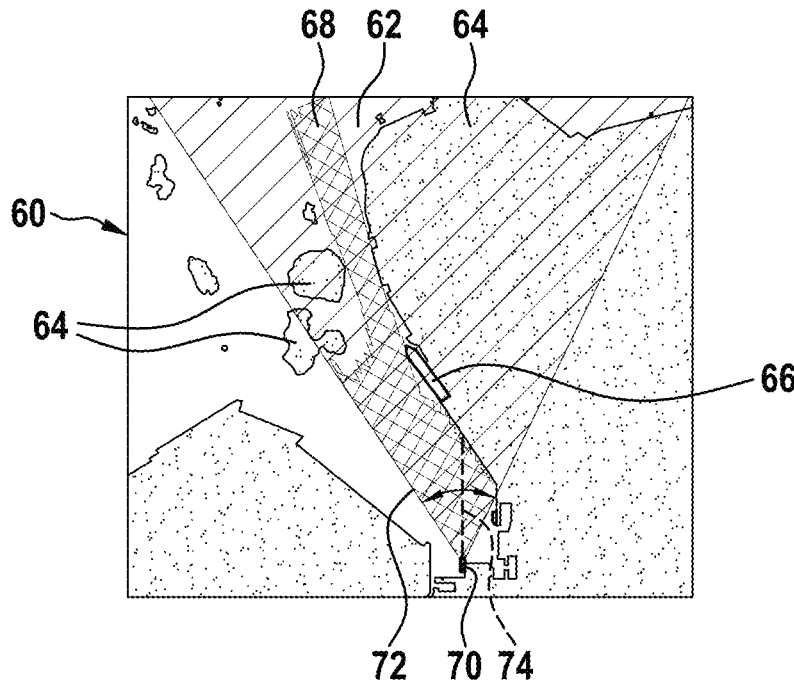
FIG. 4 shows an example of a 2D map including the region of water clearance.

FIG. 1 shows a block diagram illustrating an exemplary embodiment of a system 20 for determining a region of water clearance 68 of a water surface 62 (see FIG. 4). The system 20 may include a positioning device 22, a camera 24 for capturing an image 40 (see FIG. 3) and for generating image data ID corresponding to the image 40, a calibration component 26 which may be coupled to the camera 24 and which may be configured for providing calibration values CV of the camera 24, a segmentation component 28 coupled to the camera 24 for segmenting and/or classifying the image 40 depending on the image data ID, an extraction component 30 for extracting at least some of the pixels of the image 40, in particular the image coordinates of the corresponding pixels, a projection component 32 for projecting the image coordinates of the extracted pixels to a real-world coordinate system, and a map generator 34 for generating a 2D map 60 of the region of water clearance 68. Further, the system 20 may include a clearance component 36 for computing one or more water clearances, as explained with respect to FIG. 5, and for generating corresponding clearance data CD, which may be representative for the one or more water clearances, and/or a clearance output 38 for outputting the clearances depending on the clearance data CD.

The camera 24 and may be one or more further cameras (not shown) may be installed where most suited to assist the ship's operations. For example, the camera 24 may be arranged at different locations on an ego vessel 70. Alternatively, the camera 24 may be arranged at land, e.g., at a dock and/or within a harbor in order to assist the vessel's operations from outside of the corresponding vessel. The camera 24 may be at least one of a group of cameras, the group including a single or monocular camera, a pair of cameras or a stereo camera, a Time-Of-Flight camera, a gated camera, and a structured light camera. One or more of these cameras may be able to estimate a depth of objects shown in the image 40 relative to the camera 24. If the camera 24 provide this depth information of the corresponding scene captured by the camera 24, the image data ID may include a depth value for each of the pixels of the image 40, wherein the depth value may provide information regarding a distance between the camera 24 and the corresponding object in the real world.

Alternatively or additionally, a Pan-Tilt-Zoom (PTZ) camera may be used which enables to scan the surroundings of the ego vessel 70 and thus to increase an area in which the region of water clearance 68 may be determined. Further, if the image data ID include the depth information, i.e., the depth values, a dependence on IMU data for determining an orientation of the ego vessel 70 may be at least partly removed. For example, it is already known in the art to get information regarding a pitch and a roll of the ego vessel 70, from the depth information, at least when an orientation and position of the camera 24 with respect to the ego vessel 70 is known.

In case of using more than one camera 24, separate camera streams from the corresponding cameras 24 may be stitched together, and a new combined image 40 and corresponding image data ID may be generated. In this case, clearance and/or measurement lines from different origins may be configured and shown for desired, in other words predetermined, directions by adjusting the orientations of the cameras 24 accordingly. For example, according to a first sensor concept, a set of static conventional bullet cameras may be used to cover correspondingly different sectors of interest around the ego vessel 70. The corresponding images 40 may be projected in top view to provide partial or full coverage of the surroundings of the ego vessel 70. There may be for example 1 to 6 cameras 24 used for this first sensor concept. Alternatively, according to a second sensor concept, one or more wide-angle and/or high-resolution cameras may be oriented to show a full (or partial) 360° view of the surroundings of the ego vessel 70, may be including a waterline of the ego vessel 70. There may be used 4 to 6 cameras for this second sensor concept.

If the camera 24 is arranged on land, the positioning device 22 may be omitted or may be seen as a part of a memory of the system 20, in which the position and/or orientation of the camera 24 are stored and which is configured for providing the corresponding position data PD to the processing unit when needed.

In contrast, if the camera 24 is arranged on the ego vessel 70, the position and orientation of the camera 24 may depend on a position and orientation of the ego vessel 70 and the positioning device 22 may be configured for determining the position and orientation of the camera 24 depending on the position and orientation of the ego vessel 70, in particular at the time at which the image 40 is captured. The orientation of the ego vessel 70 may include a pitch, a yaw, and/or a roll of the ego vessel 70. The position of the camera 24 may be determined by the position of the ego vessel 70 and by the position of the camera 24 on the ego vessel 70, wherein the position of the ego vessel 70 may be determined depending a geo-location and on a draft of the ego vessel 70. The camera 24 may be installed at any convenient location able to cover at least a part of the surrounding of the ego vessel 70. Possible locations may for example include a bow, a stern, or one or both sides of the ego vessel 70.

The geo-location of the ego vessel 70 may be given by global coordinates, e.g., UTM-coordinates or GPS-Coordinates of the ego vessel 70. The position of the camera 24 may include a height of the camera 24 on the ego vessel 70. The position of the camera 24 may also include a position of the camera 24 on the ego vessel 70, in particular in relation to a geo-location positioning system of the ego-vessel 70, e.g., a GPS receiver of the ego vessel 70. Alternatively, the position data PD may include global coordinates of the camera 24 itself, e.g., GPS-coordinates or UTM-coordinates of the camera 24. The orientation of the camera 24 may include a pitch, a yaw, and/or a roll of the camera 24. The geo-location positioning system may be a part of the positioning device 22.

The calibration component 26 may be configured for providing calibration data for calibrating the camera 24, i.e., the calibration values CV. In the simplest case, the calibration values CV are predetermined and stored in the calibration component 26, such that the calibration component 26 may be embodied as a simple data storage medium or a part of the memory of the system 20. In a more sophisticated embodiment, the calibration component 26 may be configured for calibrating the camera 24 and for providing the corresponding calibration values CV.

The segmentation component 28 may be configured for segmenting the image 40 depending on the image data ID, in particular for semantic segmentation of the image 40. When carrying out the semantic segmentation, the segmentation component 28 may classify several parts of the image 40. For example, the segmentation component 28 is configured for classifying the image in accordance with one or more different classes, as explained below. The segmentation component 28 may include one or more neural networks for classifying the image 40. The neural network(s) may be trained by machine learning as it is known in the art.

The extraction component 30 may be configured to extract one or more groups GP1, GP2 of pixels of the image 40, in particular the image coordinates of the corresponding pixels. The groups GP1, GP2 are representative for a size, position, and/or extension of one or more parts of the image 40 identified and classified by the segmentation component 30, as explained below.

The projection component 32 may be configured for projecting the extracted image coordinates of the groups GP1, GP2 from the corresponding image coordinate system to the real world, in particular to a real-world coordinate system, and for providing the corresponding real-world coordinates RWC.

The map generator 34 may be configured for generating a 2D map 60 (see FIG. 4), in particular 2D map data 2DM, depending on the real-world coordinates RWC provided by the projection component 32.

The clearance component 36 may be configured for determining one or more water clearances depending on the 2D map data 2DM and to generate the corresponding clearance data CD.

The clearance output 38 may be configured for outputting the determined water clearances depending on the clearance data CD, wherein these water clearances are explained below with respect to FIG. 5.

The system 20 may further including a memory (not shown) configured for storing the image data ID of the image 40 captured by the camera 24, and a processing unit (not shown) which is configured for carrying out the method for determining the region of water clearance 68 of the water surface 62, as explained with respect to FIG. 2. In addition, the position data PD, the calibration values CV, and/or the 2D map data 2DM may be stored on the memory. The processing unit may be coupled to the memory such that the processing unit may receive the corresponding data when needed.

FIG. 2 shows a flow-chart of an exemplary embodiment of a method for determining the region of water clearance 68 of the water surface 62. The method may be carried out by the above system 20 or by any general-purpose computer which has access to the image data ID and the positional data PD, and may be to the calibration values CV. The method is defined by the steps shown in FIG. 2, wherein some of the steps of the method are explained with the help of FIGS. 3 to 6.

In a step S2, the image data ID of the image 40 captured by the camera 24 are received.

FIG. 3 shows an example of the image 40 received by the camera 24, with the image 40 showing an imaged water surface 42 of a waterbody and an imaged other vessel 48 sailing on the waterbody, which may be seen from the camera 24. The waterbody may be represented within the image 40 by the imaged water surface 42. The image 40 may further show imaged land 44, e.g., two imaged spits of land, and the imaged sky 46. The image 40 may show at least one imaged solid object. For example, the imaged solid object may be the imaged land 44, e.g., a dock, or the imaged other vessel 48. Alternatively or additionally, the imaged solid object may represent a container, a buoy, or an animal (each not shown) swimming on and/or extending out of the water surface 62.

In a step S4, the image data ID may be fed as an input to the segmentation component 28, e.g., to a first neural network, e.g., to a first Deep Neural Network (DNN), for semantic segmentation. Such neural network may be trained to label the pixels, e.g., each pixel, of the input image 40 as belonging to a predetermined class. The DNN may assign a probability vector including one or more probability values PV to the pixels to determine to which classes the pixels belong to. For example, in a very high-level approach, the first neural network may be trained to identify a first class of water surface pixels of the image 40, wherein each of the water surface pixels shows a part of the imaged water surface 42 with a high probability, e.g., a probability higher than that of other classes.

Further classes may be helpful to be identified by the segmentation component 28 in order to provide an accurate and safe region of water clearance 68. For example, in another high-level approach, the first neural network may be configured, in particular trained, to identify the first class of the water surface pixels and a second class of solid object pixels of the image 40, wherein the solid object pixels may belong to any imaged solid object within the image 40. For example, the segmentation component 28 may be configured, in particular trained, to determine solid object pixels of the image 40 which show an imaged solid object touching the imaged water surface 42. The imaged solid object may be a representation of the corresponding solid object within the image 40. The imaged solid object may be an object swimming on the waterbody, e.g., the imaged other vessel 48, a container, a bird, or a buoy, or an object forming a boundary of the waterbody, e.g., the imaged land 44 or a part of the imaged land 44, e.g., a dock. The neural network for this semantic segmentation may be the first neural network or a second neural network. As another alternative for a high-level approach, three classes may be considered by the segmentation component 28, i.e., water surface, vessel, and void. In any of these cases, the first neural network may be trained with an amount of historical images, which show water surfaces, one or more solid objects, may be vessels, and may be void, and which are already correspondingly labelled. This kind of machine learning may be referred to as supervised learning, as it is known in the art.

The segmentation component 28 may be configured for determining whether the solid object, which is represented by the imaged solid object in the image 40, physically touches the water surface 62 in the real world. A solid object not touching the water surface 62 may be a structure within a field of view 72 (see FIG. 4) of the camera 24 but not being related to the water surface 62 in the real world, e.g., a bird flying through the field of view 72 when the image 40 was captured, or a structure fixedly coupled to the camera 24, e.g., a structure of the ego vessel 70 or a structure on land 64 on which the camera 24 is arranged. The solid object not touching the water surface 62 may be determined by a neural network, which may have been trained on detecting corresponding solid objects in images, wherein the neural network may be the first or the second neural network, or a third neural network. In case of the first neural network determining whether the solid object, which is represented by the imaged solid object in the image 40, physically touches the water surface 62 in the real world or not, the first neural network may be trained such that it is able to determine at least three classes, i.e., water surface, solid object touching the water surface, and solid object not touching the water surface.

Alternatively, the solid object not touching the water surface may be determined by simple post-processing of one or more of the images 40 captured by the camera 24. For example, in case of a bird flying through the field of view 72 of the camera 24 as the solid object not touching the water surface, it may be determined whether the bird touches the water surface in the real world by comparing several images captured by the camera 24 one after the other and by checking whether the speed with which the bird moves from one image to the other is sensible for a bird swimming on the water surface 62 or not. Alternatively, in case of the structure fixedly coupled to the camera 24 as the solid object not touching the water surface 62, it may be determined whether the structure touches the water surface 62 in the real world or not by comparing several images captured by the camera 24 one after the other and by checking whether a position of the structure within the image 40 depends on a movement of the camera 24 and in case the vessel on which the camera 24 is arranged or not. In case the position of the structure does not change in relation to the movement of the camera 24, the structure may be considered as being fixedly coupled to the camera 24 and as not touching the water surface 62 in the real world. These comparisons may be carried out and the corresponding results may be achieved by the second or third neural network or by simple image and/or video processing as it is known in the art.

In case of using one neural network only for determining the water surface pixels, the solid object pixels, and/or the solid objects not touching the water surface 62, e.g., the first neural network, the corresponding neural network may be trained to classify the image 40 in several classes, wherein several class combinations corresponding to different levels may be possible. For example, a high-level class combination could be "water surface", "solid object", and "sky", wherein the solid object may further be classified as "solid object touching the water surface" and "solid object not touching the water surface". At a lower level, the class "solid object" may be further divided into "animal", "land", "dock" and/or "other vessels". At an even lower level, the class "animal" may be further divided into "bird" and "wale". At an even lower level, the class "bird" may be further divided into "flying bird" and "swimming bird". Alternatively or additionally, the class "solid object" may be further divided into "big solid object" and "small solid object", and/or into "fast solid object" and "slow solid object", and/or "danger-ous solid object" and "non-dangerous solid object". Further, the above classes may be combined. For example, one class may refer to "dangerous animal" and another may refer to "non-dangerous solid object".

Alternatively, in case of using one neural network only for determining the water surface pixels, the solid object pixels, and/or the solid object not touching the water surface, e.g., the first neural network, the corresponding neural network may be trained to classify the image in accordance with one of the high level class combinations, e.g., "water", "solid object", and "sky", or "water", "animal", "land", "other vessel" and "sky", and the solid objects may be further differentiated by post processing, e.g., by checking the speed and/or the size of the corresponding solid objects.

In case of using two or more neural networks for deter-mining the water surface pixels, the solid object pixels, and/or the solid object not touching the water surface, e.g., the first, second, and/or third neural network, one of the neural networks may be trained to classify the image at a high level, e.g., as defined above, e.g., "water", "solid object" and "sky", and another one of the neural networks may differentiate the solid objects in accordance with the one of the lower level class combinations, e.g., as defined above. For example, the first neural network may determine the water surface pixels and the solid object pixels neigh-boring or touching the water surface pixels, and the second or third neural network may check whether the solid objects found in the image 40 are dangerous for navigating the ego vessel 70 or not.

In case of using more than one camera 24, the corre-sponding image and/or video streams may be used sepa-rately for the semantic segmentation. Then, the correspond-ing result, e.g., the 2D map 60 (see FIG. 4) may be used to produce camera-based measurements, e.g., augmented on the top view of the ego vessel 70.

If the image 40 does not show any imaged water surface, no water surface pixels may be determined from the image data ID. In this case, the method may be terminated after carrying out step S4, with the result that there is no region of water clearance 68. Alternatively, step S4 may be carried out until image data ID of an image 40 are provided, which shows at least one imaged water surface 42.

In a step S6, image coordinates of at least a first group GP1 of the determined water surface pixels in an image coordinate system may be determined, e.g., by the extraction component 30, wherein the first group GP1 is representative for the imaged water surface 42. In the simplest case, the first group GP1 of water surface pixels may include all water surface pixels identified by the segmentation component 28. Alternatively, a polygon describing, limiting, and/or sur-rounding the imaged water surface 42 may be extracted once the segmented image and the corresponding probability values PV are available. So, the first group GP1 may represent a boundary of the imaged water surface 42 and/or may be a polygon. The boundary may include the outermost pixels of the imaged water surface 42 and/or the polygon, which may be referred to as outer polygon, surrounding the imaged water surface 42 such that the imaged water surface 42 may be constructed from the first group GP1 of the determined water surface pixels. If the imaged water surface 42 includes an imaged hole, e.g., because of a solid object in the waterbody, e.g., an island, a buoy, or a container swimming on the water surface 62, the boundary alternatively or additionally may include the innermost pixels of the imaged water surface 42 surrounding the corresponding imaged hole in the imaged water surface 42, wherein these innermost pixels may also be represented by a corresponding polygon, which may be referred to as inner polygon. So, the boundary of the water surface pixels may be given by the outer and the inner polygon, which may be grouped together within the first group GP1.

If the image 40 shows two or more imaged water surfaces 42, correspondingly two or more outer polygons describing the two or more imaged water surfaces 42 may be determined. Further, if the image 40 shows two or more imaged holes in one or more of the imaged water surfaces 42, correspondingly two or more inner polygons describing the two or more imaged holes within the corresponding imaged water surface 42 may be determined.

Additionally, image coordinates of at least a second group GP2 of the determined solid object pixels in the image coordinate system may be determined, e.g., by the extraction component 30, wherein the second group GP2 may be representative for the imaged solid object. The second group GP2 being representative for the imaged solid object may vary from image to image. The second group GP2 may include the outermost pixels of the imaged solid object. These outermost pixels form a boundary of the imaged solid object and/or a polygon surrounding the imaged solid object, e.g., such that the imaged solid object may be constructed from the second group GP2 of the determined solid object pixels. Alternatively, the second group GP2 may include all solid object pixels identified by the segmentation component 28. In case of one or more solid objects shown in the image 40 being identified as not touching the water surface 62 in step S4, the second group GP2 may be determined such that it does not include the image coordinates of the corresponding solid object pixels. In case of the segmentation component 28 being able to differentiate between more classes, as explained above, the extraction component 30 may extract correspondingly more different groups of pixel coordinates, e.g., corresponding polygons.

In a step S8, a position and an orientation of the camera 24 at the time the image 40 has been captured may be determined, e.g., by the positioning device 22 generating corresponding position data PD. In the simplest case, the camera 24 may be arranged at land 64 and may have a fixed position and orientation. In this case, the positioning device 22 for determining the position and orientation of the camera 24 may be a simple memory or a part of the memory of the system 20 and the position and orientation of the camera 24 may be determined by loading the position data from the positioning device 22.

In an alternative approach, the camera 24 may be arranged on the ego vessel 70. In this case, the position and orientation of the camera 24 may depend on a position and an orientation of the ego vessel 70, and may be determined depending on the position and orientation of the ego vessel 70. The orientation of the ego vessel 70 may include a pitch, a yaw, and/or a roll of the ego vessel 70. The pitch, a yaw, and/or a roll of the ego vessel 70 may be determined by an Inertial Measurement Unit (IMU), which may generate corresponding IMU data. The IMU may be a part of the positioning device 22 or may be coupled to the positioning device 22. The position of the camera 24 may be determined by the position of the ego vessel 70 and by the position of the camera 24 on the ego vessel 70, wherein the position of the ego vessel 70 may be determined depending a geolocation and on a draft of the ego vessel 70. The geo-location of the ego vessel 70 may be given by global coordinates, e.g., UTM-coordinates or GPS-Coordinates of the ego vessel 70. The position of the camera 24 may include a height of the camera 24 on the ego vessel 70. The position of the camera 24 may also include a position of the camera 24 on the ego vessel, in particular in relation to a geo-location positioning system of the ego vessel 70, e.g., a GPS receiver (not shown) of the ego vessel 70. Alternatively, the position of the camera 24 may include global coordinates of the camera 24 itself, e.g., GPS-coordinates or UTM-coordinates of the camera 24. The orientation of the camera 24 may include a pitch, a yaw, and/or a roll of the camera 24. If the camera 24 provides the depth information, the orientation of the ego vessel 70 and/or of the camera 24 may be at least partly determined from the depth information of the camera 24. This may enable to make the method at least partly independent from any IMU data for determining the orientation of the ego vessel 70. In this case, the IMU data may not be necessary for carrying out the method.

In a step S10, real-world coordinates RWC of the corresponding water surface 62 in the real world may be determined, e.g., by the projection component 32, by transferring at least the image coordinates of the first group GP1 to a real-world coordinate system under consideration of the determined position and orientation of the camera 24. In other words, the water polygon represented by the first group GP1 may then be projected from the image 40 to the real world. To perform the projection operation, camera calibration parameters (extrinsic and intrinsic) in the form of the calibration values CV and any motion of the vessel, for example pitch and roll provided by the position data PD may be taken into account. The projected polygon then may provide spatial information in real-world coordinates (or in vessel coordinates) of where water is identified within the field of view (FOV) 72 of the camera 24.

In case of the extracting component 30 extracting the second group GP2 or one or more further groups of pixels, as explained above, real-world coordinates of the corresponding solid objects in the real world may be determined by transferring the image coordinates of the second group GP2 and, in case, of the one or more further groups to the real-world coordinate system under consideration of the determined position and orientation of the camera 24. Then, a region, which is defined by the determined real-world coordinates of the second group GP2 and may be of the one or more further groups, may be determined as not being part of the region of water clearance 68.

The real-world coordinates RWC of the water surface 62 and, in case, of the solid objects 64, 66, in particular of the corresponding groups GP1, GP2, may be determined by any projection method known in the art, e.g. as explained and described in detail in a textbook about computer vision, e.g. "Multiple View Geometry in Computer Vision" by Richard Hartley and Andrew Zisserman, Second Edition, isbn-13 978-0-521-54051-3, e.g., PART I: Camera Geometry and Single View Geometry.

In a step S12, a region of the water surface, which is defined by the determined real-world coordinates RWC of at least the first group GP1, may be determined as the region of water clearance 68, e.g., by the map generator 34 which may generate a 2D map 60 (see FIG. 4), in particular corresponding 2D map data 2DM. In case of the second group GP2 and may be further groups of pixels referring to different solid objects on the water surface 62, the corresponding real-world coordinates RWC may define a region which does not belong to the region of water clearance 68 and which may be dangerous for the corresponding vessel, e.g., the ego vessel 70. The 2D map 60 may be outputted by displaying the 2D map 60 on a display (not shown) of the system 20. Alternatively or additionally, the 2D map data 2DM may be outputted to an entity using the 2D map 60, e.g., to a navigation system of the ego vessel 70 or of another vessel 66. The 2D map 60 may be generated with respect to the ego vessel 70, e.g., based on a corresponding vessel coordinate system, or based on a Geographic Coordinate System, e.g., in terms of latitude and/or longitude.

FIG. 4 shows an example of the 2D map 60 including the region of water clearance 68. From FIG. 4 it may be seen that the region of water clearance 68 is limited by the field of view 72 of the camera 24 on the ego vessel 70, by the land 64 and by the other vessel 66. The 2D map 60 including the region of water clearance 68 may be referred to as "safe water map" and may be used for multiple purposes including determine a clearance distance 74 along one or more predetermined directions (e.g., distance in meters), determine an angular margin to one or more dangerous solid objects 64, 66 with respect to a planned route, evaluating whether the planned route is safe, finding a safe route, e.g., in conjunction with constraints from vessel dynamics and external factors, and/or determine the closest non-water point within a sector of interest (e.g., along a heading line 82 (see FIG. 5), and/or along an intended route).

In an optional step S14 (see FIG. 2), one or more clearance distances 74 may be determined, e.g., by the clearance component 36. The clearance distance 74 may extend over the region of water clearance 68 along a predetermined direction.

In an optional step S16 (see FIG. 2), the determined clearance distance 74 may be outputted, e.g., by the clearance output 36. The clearance distance 74 may be outputted together with the predetermined direction. The clearance distance 74 may be outputted by displaying the clearance distance 74 in the predetermined direction on the display. Alternatively or additionally, the clearance distance 74 may be outputted to an entity using the clearance distance 74, e.g., to a navigation system of the ego vessel 70 or of the other vessel 66. The predetermined direction may be any direction of interest, as explained in the following.

Figure 5:
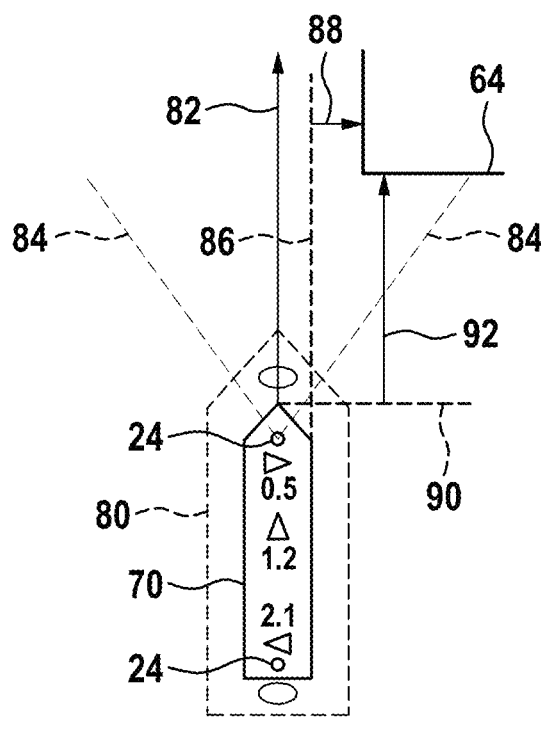
FIG. 5 shows several examples of water clearances.

FIG. 5 shows several examples of clearances distances 74 which may be determined depending on the 2D map data 2DM.

A static line 80 having the clearance distance 74 to a hull of the ego vessel 70 may surround the ego vessel 70 and may be representative for a region closest to the ego vessel 70. The static line 80 may follow a shape which corresponds to a shape of a hull of the ego vessel 70. One or more of the static lines 80 may be placed on a vessel outline to indicate and visualize distance to obstacles in arbitrary directions. Alternatively, the static line 80 may be fixed relative to the ego vessel 70. During normal operation of the ego vessel 70, i.e., no docking or landing operation, the region surrounded by the static line 80 should be free from any dangerous solid objects. In this context, the static line 80 may define a guard zone around the ego vessel 70.

Alternatively or additionally, the static line 80 may define a blind region around the hull of the ego vessel 70, which may not be visible from the camera 24. When calculating one or more clearance distances 74, the blind region may be considered with the help of the static line 80 such that the clearance distance 74 may start from the hull of the ego vessel 70. In particular, a clearance distance 74 determined from the image 40 may be enlarged by the corresponding distance along the same direction within the blind region. In other words, if the camera 24 is arranged on the ego vessel 70 and if there are blind spots next to or underneath the ego vessel 70, a size and/or extend of the blind spots defining the blind region may be determined in advance in form of the static line 80, may be stored on the memory of the entity carrying out the method, and may be considered when determining the corresponding clearance distance 74, such that the clearance distance 74 may extend from the hull of the ego vessel 70 to an end of the region of water clearance 68 along the predetermined direction.

Another clearance distance 74 may be parallel to a heading line 82 which may be representative for the current heading of the ego vessel 70. This may especially be advantageous, if the camera 24 is arranged on the ego vessel 70. In this case, the predetermined direction may correspond to the heading of the ego vessel 70.

One or more further clearance distances 74 may be parallel to correspondingly one or more lookout lines 84, wherein the lookout lines 84 may define one or more directions which may separate the field of view 72 of the camera 24 in several segments, e.g., in equal angular segments. The lookout lines 84 may start, for example, from bow and/or stern corners of the corresponding vessel 70, 66 and may indicate distances to a series of directions, e.g., with fixed angular steps, e.g., with 15° steps.

Alternatively or additionally, an object distance over which the region of water clearance 68 extends to the closest solid object 64, 66 on the water surface 62 may be determined depending on the determined region of water clearance 68, and the object distance may be outputted. The object distance may be determined parallel to one of the lookout lines 84. So, the lookout lines 84 may extend to one or more of the solid objects 64, 66 closest to the ego vessel 70. The object distance may be outputted by displaying the object distance on a display. Alternatively or additionally, the object distance may be outputted to an entity using the object distance, e.g., to the navigation system of the ego vessel 70 or of the other vessel 66. If the camera 24 is arranged on the ego vessel 70 and if there are the blind spots next to or underneath the ego vessel 70, the size and/or extend of the blind spots may be determined in advance and may be considered when determining the object distance, e.g., as explained above in context with the clearance distance 74.

Alternatively or additionally, one or more docking lines, a first docking line 86 and/or a second docking line 90 may start, for example, from a side waterline of the corresponding vessel 66, 70 at bow and/or stern and may define a first object distance 88 and/or, respectively, a second object distance 92 towards the corresponding quay side. Alternatively or additionally, one or more bow and/or stern keel-lines (not shown) may define the distances to a quay ramp (not shown).

In general, the predetermined directions and corresponding measurement lines may start from a freely configurable location within the vessel coordinate system, wherein the corresponding distance may be measured from the configured origin to the point where the corresponding line exits the region of water clearance 68 and enters the non-water area, along the predetermined direction from the origin.

Figure 6:
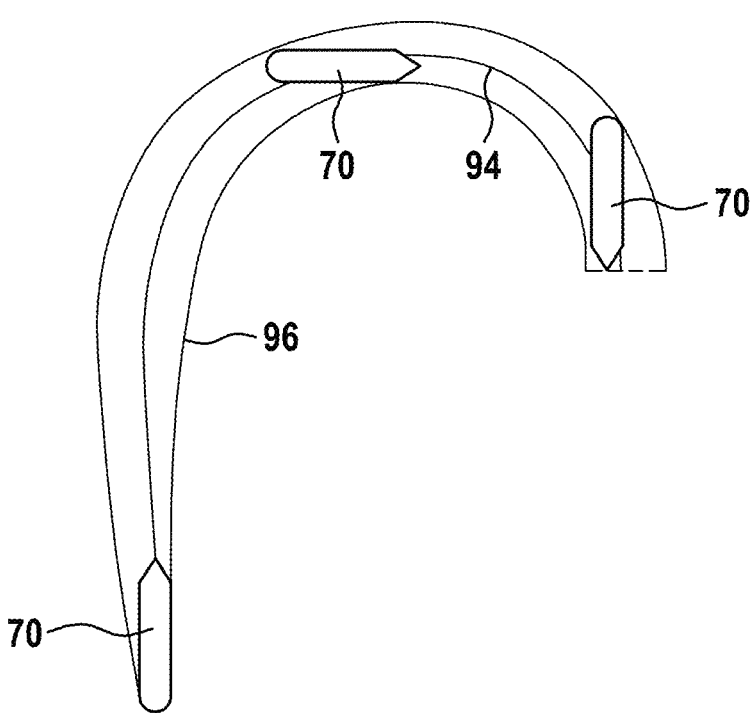
FIG. 6 shows an example of a swipe area.

Measurement lines along which the clearance distance 74 may be measured, may also start from a dynamic element, such as a predicted trajectory of the ego vessel 70 and/or the resulting swipe area 96 (see FIG. 6). So, the predetermined direction may be a direction of at least a segment of a route or of the swipe area 96 of the ego vessel 70. In particular, the predetermined direction may be a direction of at least a segment of the swipe area 96 of the ego vessel 70.

FIG. 6 shows an example of the swipe area 96. In this context, the swipe area 96 may be a predicted swipe area and may predict those parts of the water surface 62 which may be covered by the ego vessel 70 in the near future, e.g., within the next seconds and/or minutes. In particular, for safely navigating the ego vessel 70, it may be of interest, whether any solid object is within or even close to the swipe area 96. The swipe area 96 may be defined by the route, in other words course, of the ego vessel 70, by the extension of the ego vessel 70, and by the orientation of the ego vessel 70 along the route. The route may correspond to a center path 94 of the ego vessel 70. The trajectory of the ego vessel 70 may correspond to a tangent to the swipe area 96 or to the center path 94.

If the 2D map 60 and the swipe area 96 are determined, it may be easily determined whether the current route or swipe area 96, both of which extend at least in part through the region of water clearance 68, is safe or not. For example, it may be determined whether one or more solid objects 64, 66 are in the way along the route or, respectively swipe area 96, and if so, the route or, respectively swipe area 96, may be determined as not being safe. In this case, an alert may be generated. In addition, if a PTZ camera is available, the PTZ camera may be pointed towards the corresponding solid object 64, 66 in order to verify whether there is a dangerous situation for the ego vessel 70 or not.

Alternatively, if the 2D map 60 and the swipe area 96 are determined, a safe route or a swipe area 96 for the corresponding vessel may be determined depending on the region of water clearance 68. For example, the route may be determined such that the corresponding vessel may be safely navigated through the region of water clearance 68. The corresponding vessel may be the ego vessel 70 on which the camera 24 is arranged or the other vessel 66, for example if the camera 24 is arranged on land 64 and is used for safely guiding the other vessel 66 through the waterbody.

Alternatively or additionally, an angular margin to one or more of the solid objects 64, 66 may be determined depending on the determined region of water clearance 68. The angular margin may be determined with respect to the current route and/or the swipe area 96 of the ego vessel 70 or the other vessel 66.

The neural networks and components mentioned above, e.g., the segmentation component, i.e., the first, second, and/or third neural network, the positioning device 22, the calibration component 26, the extracting component 30, the projection component 32, the map generator 34, the clearance component 36, and/or the clearance output 38, each may be implemented by software, hardware, or a combination of software and hardware.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. A single processing unit or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for determining a region of water clearance of a water surface, the method comprising:

receiving image data (ID) of an image captured by a camera;

determining water surface pixels of the image from the image data (ID), wherein the water surface pixels show an imaged water surface within the image;

determining image coordinates of at least a first group (GP1) of the determined water surface pixels in an image coordinate system, wherein the first group (GP1) is representative for the imaged water surface;

determining solid object pixels of the image which show an imaged solid object touching the imaged water surface;

determining image coordinates of at least a second group (GP2) of the determined solid object pixels in the image coordinate system, wherein the second group (GP2) is representative for the imaged solid object;

determining whether the solid object, which is represented by the imaged solid object in the image, physically touches the water surface in real world;

determining a position and an orientation of the camera at a time the image has been captured;

determining real-world coordinates (RWC) of the corresponding water surface in the real world by transferring at least the image coordinates of the first group (GPI) to a real-world coordinate system under consideration of the determined position and orientation of the camera;

determining real-world coordinates (RWC) of the corresponding solid object in the real world by transferring at least the image coordinates of the second group (GP2) to the real-world coordinate system under consideration of the determined position and orientation of the camera, when the solid object physically touches the water surface in the real world;

determining a region of the water surface, which is defined by the determined real-world coordinates of the first group (GPI), as the region of water clearance; and determining a region, which is defined by the determined real-world coordinates (RWC) of the second group (GP2), as not being part of the region of water clearance.

2. The method in accordance with claim 1, wherein the camera is arranged on an ego vessel;

wherein the position and orientation of the camera depends on a position and an orientation of the ego vessel; and wherein the position and orientation of the camera is determined depending on the position and orientation of the ego vessel.

3. The method in accordance with claim 1, wherein:

the determining of the region of water clearance comprises generating 2D map data (2DM) of a 2D map of the region of water clearance in the real-world coordinate system; and the method comprises outputting the 2D map.

4. The method in accordance with claim 1, the method comprising:

determining a clearance distance over which the region of water clearance extends along a predetermined direction depending on the determined region of water clearance; and outputting the clearance distance.

5. The method in accordance with claim 4, wherein the camera is arranged on an ego vessel; and wherein the predetermined direction is a direction of at least a segment of a swipe area of the ego vessel.

6. The method in accordance with claim 1, the method comprising:

determining an object distance over which the region of water clearance extends to the closest solid object on the water surface depending on the determined region of water clearance; and outputting the object distance.

7. The method in accordance with claim 1, wherein the camera is arranged on an ego vessel; and wherein an angular margin to the solid object is determined depending on the determined region of water clearance.

8. The method in accordance with claim 1, the method comprising:

determining whether a current route or a swipe area, which extends at least in part through the region of water clearance, of a vessel is safe.

9. The method in accordance with claim 1, the method comprising:

determining a safe route or a swipe area for a vessel depending on the region of water clearance.

10. The method in accordance with claim 1, wherein calibration values (CV) of the camera are determined; and wherein the real-world coordinates (RWC) of the water surface are determined depending on the calibration values (CV).

11. The method in accordance with claim 1, the method comprising:

receiving image data (ID) of another image of at least a part of the water surface captured at the same time as the image; and determining the region of water clearance depending on the image data (ID) of the other image.

12. A system for determining a region of water clearance of a water surface, the system comprising a memory configured to store image data (ID) of an image captured by a camera, and a processing unit which is configured to carry out the method in accordance with claim 1.

\* \* \* \* \*